(12) United States Patent
Bulusu et al.

(10) Patent No.: US 7,143,277 B2
(45) Date of Patent: Nov. 28, 2006

(54) METHODS AND APPARATUS FOR EVENT BASED CONSOLE VARIABLE COHERENCE MAINTENANCE IN A PRE-BOOT ENVIRONMENT

(75) Inventors: Mallik Bulusu, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 10/223,418

(22) Filed: Aug. 19, 2002

(65) Prior Publication Data

US 2004/0034764 A1 Feb. 19, 2004

(51) Int. Cl.
G06F 11/00 (2006.01)
(52) U.S. Cl. .................... 713/2; 713/1; 714/38
(58) Field of Classification Search .............. 713/1, 713/2; 714/38
See application file for complete search history.

(56) References Cited

U.S. PATENT DOCUMENTS

| | | | |
|---|---|---|---|
| 5,630,076 A * | 5/1997 | Saulpaugh et al. ......... | 710/104 |
| 5,854,905 A * | 12/1998 | Garney ...................... | 710/104 |
| 6,081,890 A | 6/2000 | Datta | |
| 6,272,629 B1 | 8/2001 | Stewart | |
| 6,324,644 B1 * | 11/2001 | Rakavy et al. ................ | 713/1 |
| 6,367,074 B1 | 4/2002 | Bates et al. | |
| 6,463,535 B1 | 10/2002 | Drews | |
| 6,505,258 B1 * | 1/2003 | Sakarda et al. ............... | 710/18 |
| 6,505,298 B1 * | 1/2003 | Cerbini et al. ................ | 713/1 |
| 2003/0110369 A1 * | 6/2003 | Fish et al. .................... | 713/1 |
| 2003/0115443 A1 * | 6/2003 | Cepulis et al. ................ | 713/2 |

* cited by examiner

*Primary Examiner*—Scott Baderman
*Assistant Examiner*—Brian Assessor
(74) *Attorney, Agent, or Firm*—Marshall, Gerstein & Borun LLP (57) ABSTRACT

Methods and apparatus for event based console management in a pre-boot environment are disclosed. For example, an event handler is provided for use in a computer having a processor. The example event handler includes a console maintenance agent in communication with the controller to monitor the computer and a driver monitor in communication with the controller to monitor a first driver. The event handler also includes an error monitor in communication with the controller to monitor the computer for a system error and a driver loader in communication with the controller to load a second driver for a console.

8 Claims, 5 Drawing Sheets

METHODS AND APPARATUS FOR EVENT BASED CONSOLE VARIABLE COHERENCE MAINTENANCE IN A PRE-BOOT ENVIRONMENT

FIELD OF THE DISCLOSURE

The patent relates generally to console management for an interface between an operating system and a platform's firmware, and more particularly, to methods and apparatus for event based console management in an Extensible Firmware Interface (hereafter "EFI") based pre-boot environment or other suitable pre-boot environment.

BACKGROUND

The boot environment for computers presents significant challenges to innovation within the hardware and software industries. Each new platform capability or hardware innovation requires firmware developers to craft increasingly complex solutions, and often requires Operating System (OS) developers to make changes to their boot code before customers can benefit from the innovation. This can be a time-consuming process requiring a significant investment of resources. The hardware and software industries have attempted to allow the platform and OS to evolve and innovate independently of one another.

To permit such independent innovation and maintain necessary communication between an OS and platform firmware (any software that is included in read-only memory (ROM), an interface having an additional layer of firmware code provides for the abstraction of the OS and all higher level software from the firmware. The interface operates in what is referred to as a pre-boot environment. Previous attempts to develop such an interface have required the OS to have specific knowledge of the workings of certain hardware devices. Previous attempts at developing the interface were not effective or did not allow for the dynamic management of those devices in the pre-boot environment.

DESCRIPTION OF THE PREFERRED EXAMPLES

Figure 1:
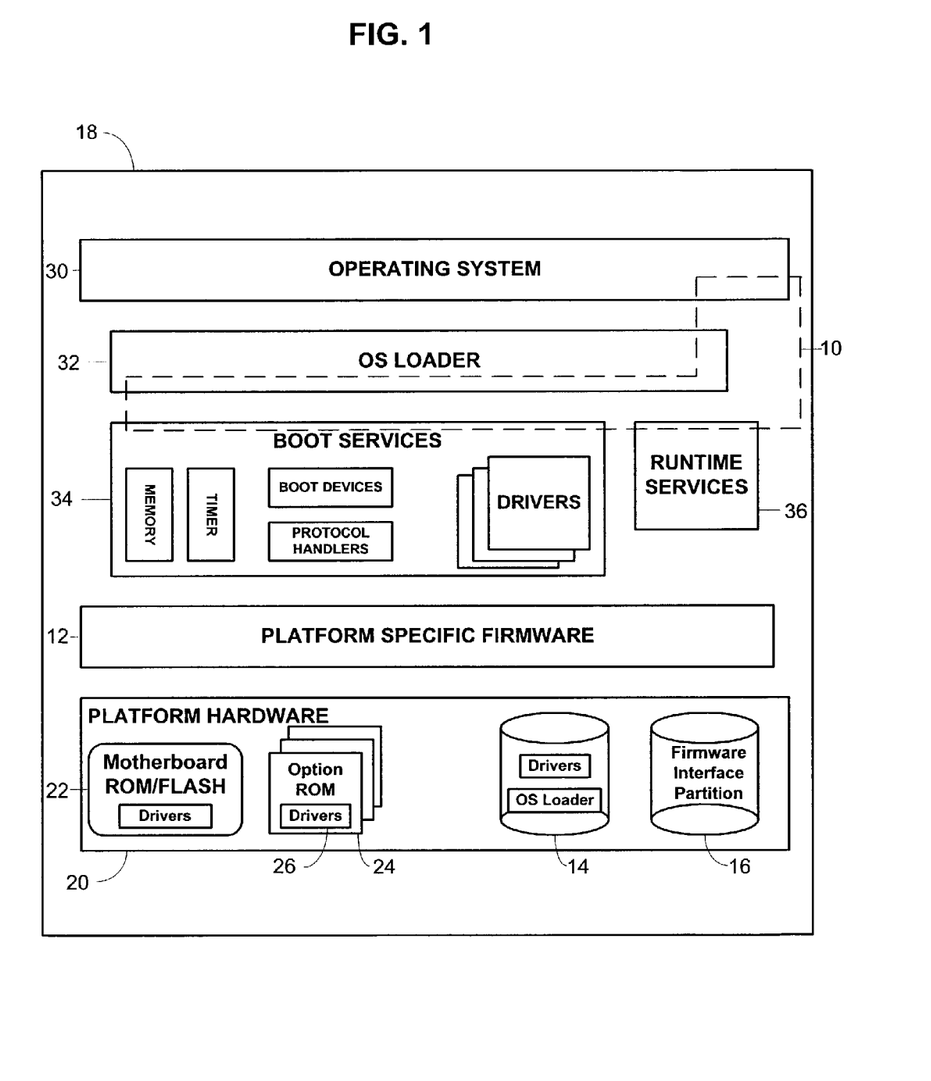
FIG. 1 illustrates some of the principal components of an example interface and their relationship to platform hardware and OS software.

FIG. 1 is a block diagram of components of an example interface 10 constructed in accordance with the teachings of the invention. This diagram illustrates the interactions of the various components accessed by the interface 10 to accomplish platform and OS boot. The platform firmware 12 is able to retrieve an OS loader image 14 from an interface system partition 16. The hardware and software components illustrated in FIG. 1 are some of the integral components of a computer 18.

The interface system partition 16 is one of several components included in the platform hardware 20. The platform hardware 20 also includes the motherboard flash memory 22, a plurality of option Read Only Memories (ROMs) 24 and a plurality of drivers 26. As used herein "driver" refers to a module of code typically inserted into the firmware via protocol interfaces. A protocol is akin to a C++ Class; it is a collection of read-only data and a collection of callable interfaces. The latter are similar to C++ methods. These interfaces are named by 16-byte unique identifiers, also known as Globally Unique Ids (GUIDs). Interface drivers may provide device support during the boot process or they may provide platform services. In contrast, OS drivers are loaded to provide device support once the OS 30 takes control of the platform hardware 20.

A variety of mass storage devices including, for example, disk, CD-ROM and DVD may be supported by the interface 10 to boot the OS 30. The OS 30 may also be remotely booted via a network. Persons of ordinary skill in the art will appreciate that other boot media types may be added to the platform hardware 20.

The interface 10 communicates with an OS loader 32. Once started, the OS loader 32 continues to boot the complete operating system 30. To do so, the OS loader 32 uses the interface boot services 34 and the interface 10 to survey, comprehend and initialize the various platform components and the OS software that manages them. Interface runtime services 36 are also available to the OS loader 32 during the boot phase. It should be noted that the interface 10 supports platform hardware architecture that has both 32 and 64 bit instruction capabilities, as well as future advancements.

The computer 18 of the instant example includes a few additional hardware components found in conventional computers, such as, for example, personal computers, laptops, notebooks, servers, etc. The computer 18 may optionally include modifications to that conventional construction as explained in detail below. Thus, as shown in FIG. 2, the computer 18 includes a central processing unit 40 which is implemented, for example, by one or more Intel® microprocessors from the Pentium® family, the Itanium™ family, the XScale™ family or any other family of microprocessors.

In the illustrated example, the interface 10 is Intel's Extensible Firmware Interface (hereafter "EFI") which is an open extensible interface that lends itself to the creation of platform drivers. These drivers may be analogous to OS drivers, providing support for new device types during the boot process, or they may be used to implement enhanced platform capabilities such as fault tolerance or security. The EFI helps developers avoid many of the frustrations inherent in trying to squeeze new code into a traditional Basic Input/Output System (hereafter "BIOS") environment. BIOS may be described in most instances as a collection of low-level service routines. As previously discussed, the EFI gives firmware developers an infrastructure to add capability to the platform in a modular way. The drivers may be implemented using high level coding languages because of the calling conventions and environment provided by the EFI. This in turn may help to reduce the difficulty and cost of innovation. The option of the Interface Partition 16 shown in FIG. 1 (which is a segment of a partition of, for example, a hard disk drive), provides an alternative to non-volatile memory storage for such extensions.

Figure 2:
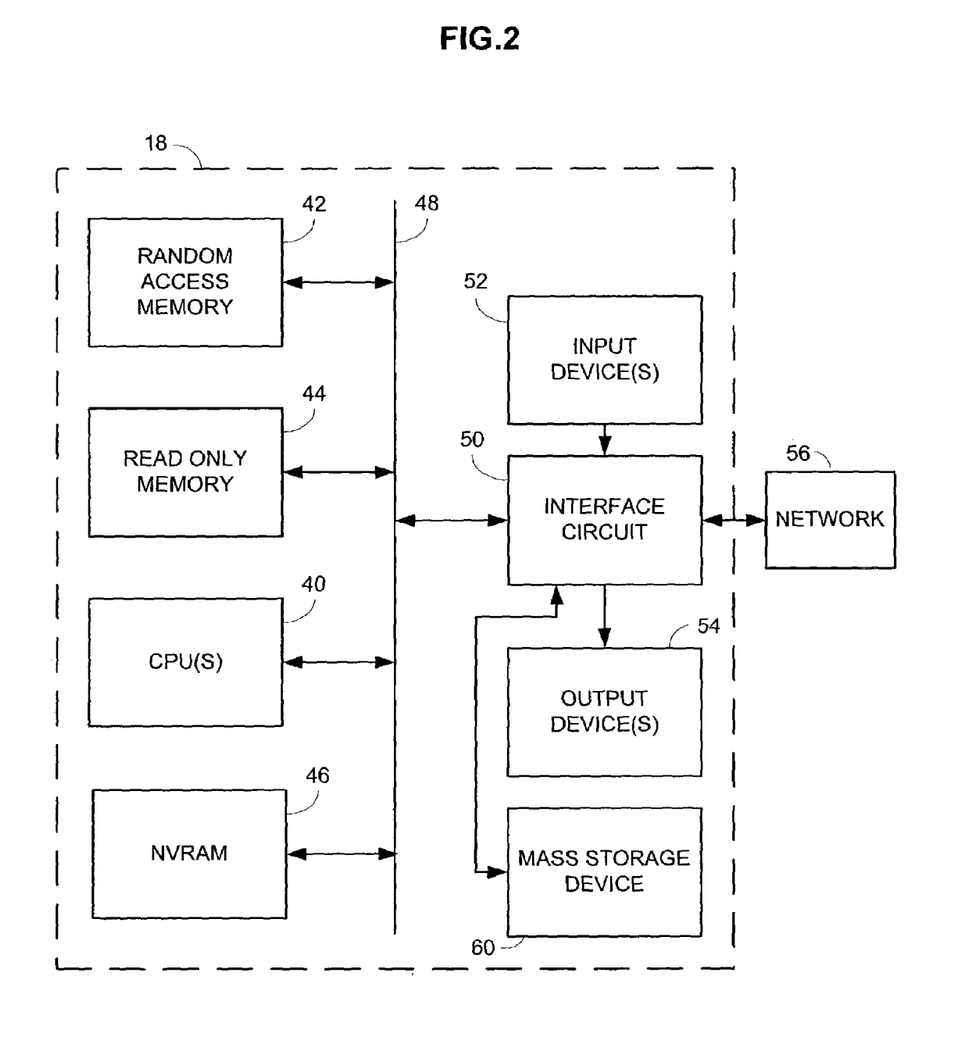
FIG. 2 is a block diagram of an example computer utilizing the components of FIG. 1.

Referring to FIG. 2, as is conventional, the central processing unit 40 is in communication with a volatile memory 42, a non-volatile memory 44, and a non-volatile random access memory (NVRAM) 46 via a bus 48. The volatile memory may be implemented by SDRAM, DRAM, RAM-BUS or any other type of random access memory device. The non-volatile memory 44 may be implemented by flash memory or any other desired type of memory device. Access to the memory 42 is typically controlled by a memory controller (not shown) in a conventional manner.

The computer 18 also includes a conventional interface circuit 50. The interface circuit 50 may be implemented by any type of well known interface standard, such as an Ethernet interface, a universal serial bus (USB) and/or a third generation input/output (3GIO) interface (also known as PCI Express).

One or more input devices 52, generically referred to herein as consoles, are connected to the interface circuit 50. The input device(s) 52 permit a user to enter data and commands into the CPU 40. The input device(s) can be implemented by, for example, a keyboard, a mouse, a touchscreen, a track-pad, a trackball, isopoint and/or a voice recognition system.

One or more output devices 54, also generically referred to herein as consoles, are also connected to the interface circuit 50. The output devices 54 can be implemented, for example, by display devices, a printer and/or speakers. The interface circuit 50 would, thus, typically include a graphics driver card.

The interface circuit 50 may also include a communication device such as a modem or network interface card to facilitate exchange of data with external computers via a network 56 (e.g., an Ethernet connection, a digital subscriber line (DSL), a telephone line, coaxial cable, a cellular telephone system, etc.). Typically, the computer 18 also includes one or more mass storage devices 60 for storing software and data. Examples of such mass storage devices include floppy disk drives, hard drive disks, compact disk drives and digital versatile disk (DVD) drives.

Figure 3:
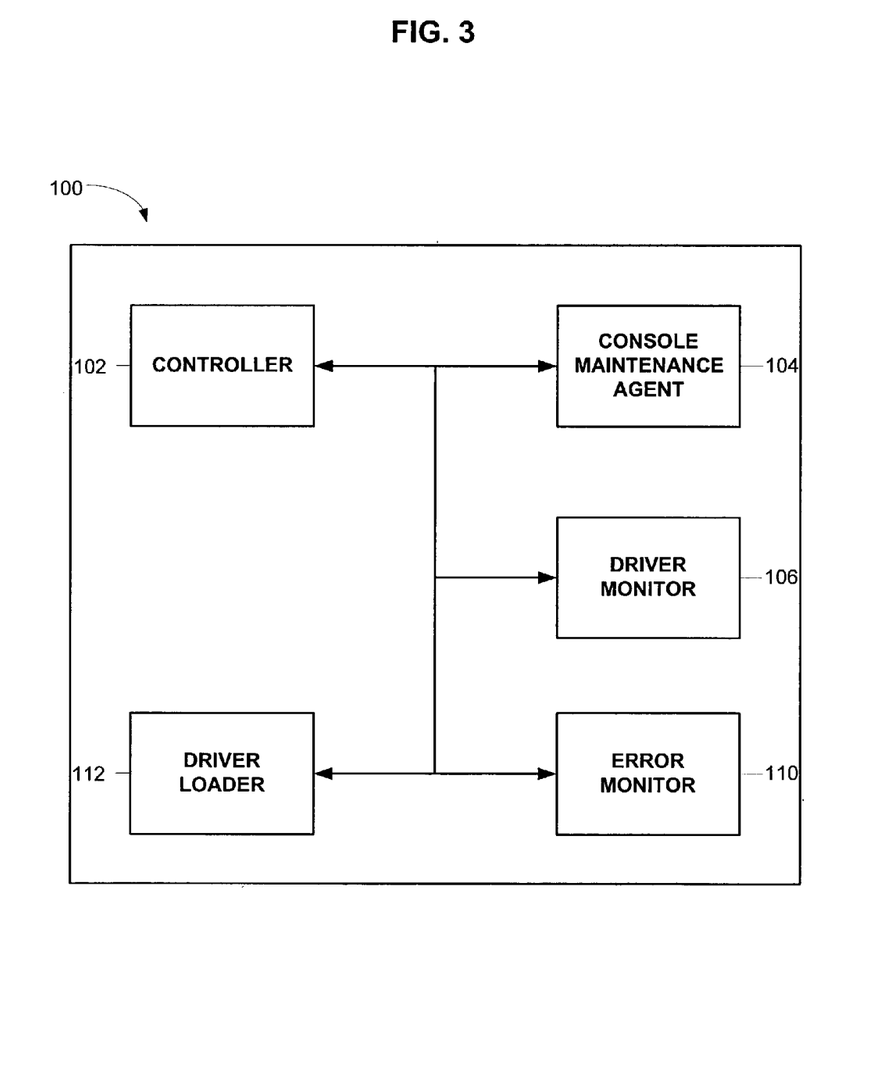
FIG. 3 is a schematic illustration showing an example interface event handler constructed in accordance with the teachings of the invention.

The interface 10 for the computer 18 shown in FIG. 1 includes an event handler 100 to perform event based console management in the pre-boot environment. FIG. 3 illustrates schematically an example event handler 100 to dynamically manage a plurality of consoles before the operating system 30 is loaded. The event handler 100 manages the consoles with a controller 102 that communicates with a console maintenance agent 104, a driver monitor 106, and an error monitor 110. The event handler 100 also includes a driver loader 112 that communicates with the controller 102, for loading appropriate drivers in the pre-boot environment.

As previously discussed, the term "console" includes all types of input/output devices. Examples of consoles are monitors, COM ports, LANs, 1394 devices, USB devices, PS/2 devices, service processors, keyboards, mice, pointing devices, etc. For example, a device path for a COM port may have multiple nodes, which could include an ACPI node, a PCI node, a UART node and a Vendor Defined Message Path node. For COM ports, the Vendor Defined Message Path is dynamic in nature in that it includes information such as baud rate, parity bit designation, stop bit designation, etc. The device-path is a binary name-space that is composed of the aforementioned nodes. The catenation of the nodes describes the means by which to discover the device location. Thus it is possible to have a PCI_NODE to describe the location of the PCI bus-based device (bus #, device #, function #). It is then possible to have a messaging node to describe the type of technology (Ethernet, with MAC address). It is further possible to also have a software node describing the protocol (TCP/IP with the IP address).

From the perspective of the interface 10 and the event handler 100, the consoles are grouped into three categories, which are input, output, and standard error consoles. Standard error consoles are a special type of output console and are set active by the event handler 100 when enabled. The event handler 100 manages theses consoles using two sets of global variables that have architecturally defined meanings. A first set of global variables include ConIn, ConOut, and StdErr. ConIn is the device path of the default input console. ConOut is the device path of the default output console. StdErr is the device path of the default error output console. The ConIn, ConOut, and StdErr variables each contain an interface device path descriptor that defines the default device to use on boot. In addition to the defined data content of these variables, each such variable also has an architecturally defined attribute that indicates when the data variable may be accessed. This first set of global variables is maintained in the NVRAM 46 and is communicated to the OS 30. Changes to these variables do not normally take effect until the next time the platform firmware is rebooted. However, there is a provision to force changes to take effect immediately by invoking disconnect/connect services. If the firmware cannot resolve the device path, it is allowed to automatically replace the value(s) as needed to provide a console for the system.

A second category of global variables includes ConInDev, ConOutDev, and StdErrDev. ConInDev is the device path of all possible console input devices. ConOutDev is the device path of all possible console output devices. StdErrDev is the device path of all possible error output devices. The ConInDev, ConOutDev, and StdErrDev variables each contain an interface device path descriptor that defines all the possible default devices to use on boot. These variables are volatile and are set dynamically on every boot. ConIn, ConOut, and StdErr are proper subsets of ConInDev, ConOutDev, and StdErrDev. In addition to the defined data content of this second set of global variables, these variables also have an architecturally defined attribute that indicates when the data variable may be accessed. The second set of global variables is maintained in the RAM 42. Therefore, the values of these variables are lost when power is removed from the system and the state of firmware reserved memory is not otherwise preserved.

Described more generically, each of the global variables discussed above is a multi-instance device path, wherein each device path instance is made of several nodes that represent a unique console. There is also a special device path used by the interface 10, called EndDevicePath, which acts as a delimiter and/or a terminating node in a multi-instance device path. Although in the illustrated example, the global variables have been grouped into specific categories and described with specific names, persons of ordinary skill in the art will appreciate that any other variable categories and names could alternatively be employed.

Referring again to FIG. 3, the console maintenance agent 104 monitors the computer 18 in the pre-boot environment for an event of interest. Events of interest are described in more detail below, but briefly, they are events that affect a console configuration, and include, for example: the addition of a new console, the detachment of an existing console, the addition of a new or better driver, console ownership transitions, and system errors. More specifically, the console maintenance agent 104 monitors the computer 18 for the attachment and detachment of consoles to the computer 18, as well as for resource contention. If the console maintenance agent 104 detects one of the foregoing events before the OS 30 is loaded, the event is communicated to the controller 102.

The driver monitor 106 also monitors the computer 18 for an event of interest. As an example, the driver monitor 106 monitors the computer 18 to determine if a new driver has been added. The driver monitor 106 then communicates the addition of the new driver to the controller 102.

The error monitor 110 also monitors the computer 18 for an event of interest. For example, the error monitor 110 may monitor the computer 18 for the occurrence of a system error in the pre-boot environment. The detection of an error is then communicated to the controller 102.

The driver loader 112 works in conjunction with the controller 102 to load drivers from the NVRAM 46 and to activate the drivers by invoking a start routine for each device connected to the computer 18.

Together, the controller 102 and the driver loader 112 support the dynamic configuration of a plurality of drivers. The controller 102 commands the driver loader 112 through a load service, a start service, and a stop service to detach a driver managing a particular device and start another driver to manage the device. In console management, the ability to dynamically configure a plurality of drivers is extremely useful. For example, such a feature is helpful in providing a new driver to handle additional keyboard scan codes to meet the requirements of far-east users.

Figure 4:
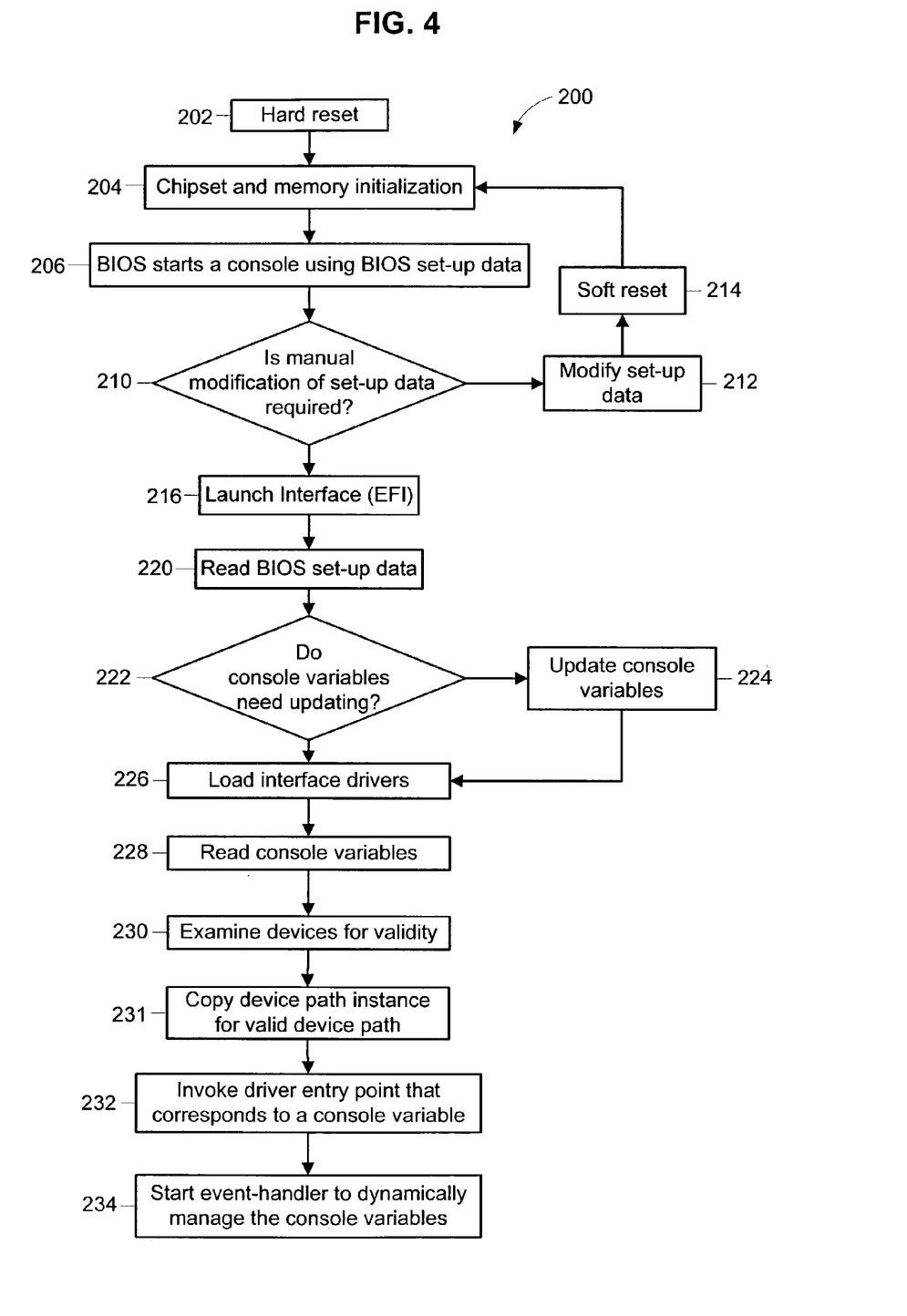
FIG. 4 is a flowchart illustrating some events to provide an initial console variable set-up in a pre-boot environment.
Figure 5:
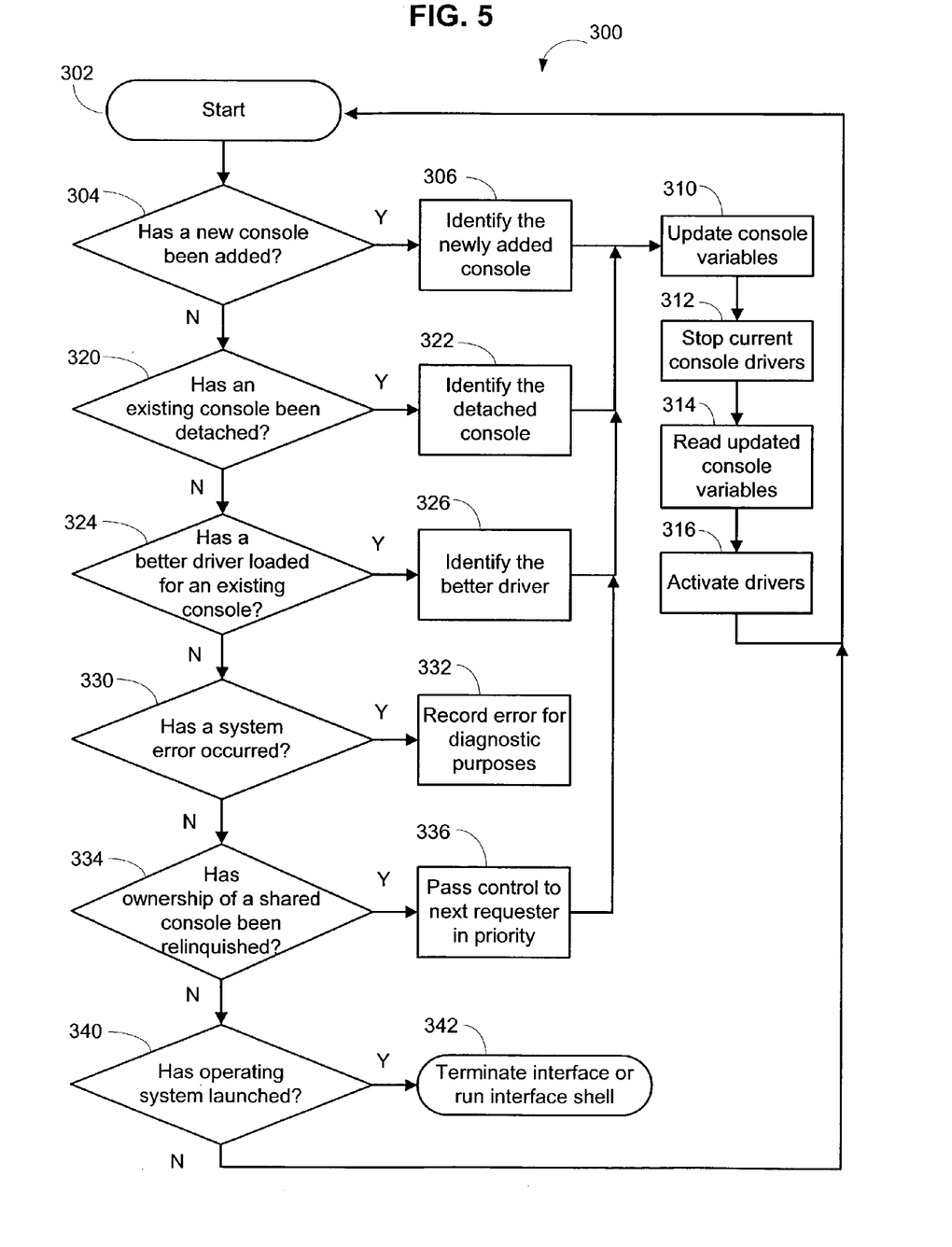
FIG. 5 is a flowchart illustrating a software program implementing the event handler of FIG. 3.

An example software program for implementing the event handler 100 of FIG. 3, is shown in FIGS. 4 and 5. In this example, the program is for execution by the processor 40 and is embodied in software stored on a tangible medium such as a CD-ROM, a floppy disk, a hard drive, a digital versatile disk (DVD), or a memory associated with the processor 40, but persons of ordinary skill in the art will readily appreciate that the entire program or parts thereof could alternatively be executed by a device other than the processor 40 and/or embodied in the firmware 12 or dedicated hardware in a well known manner. For example, any or all of the controller 102, the console maintenance agent 104, the driver monitor 106, the error monitor 110, and/or the driver loader 112 could be implemented by software, hardware, and/or firmware. Further, although the example program is described with reference to the flowcharts illustrated in FIGS. 4 and 5, persons of ordinary skill in the art will readily appreciate that many other methods of implementing the event handler 100 of FIG. 3 may alternatively be used. For example, the order of many of the blocks may be changed, and/or some of the blocks described may be changed, eliminated, or combined.

Referring to FIG. 4, the flowchart 200 illustrates a program to prepare one or more initial consoles and to program a plurality of variables to provide to the interface 10 an initial snapshot of consoles that are required. After a hard reset (block 202) where the computer 18 is reset via a reset switch or turned on for the first time, a chipset and memory initialization are performed (block 204). The chipset and memory initialization typically includes providing access to one or more industry standard data buses. Once the initial chipset and memory initialization has been performed, the computer's BIOS, which is stored in nonvolatile memory 44, is launched to create published basic services. The BIOS then starts one or more consoles using BIOS set-up data (block 206). In this example, the BIOS provides the user an opportunity to manually modify the configuration of any of the console variables. If a manual modification of the set-up data has been requested by the user (block 210), the set-up data is modified (block 212) and a soft reset is initiated (block 214). After the soft reset is initiated (block 214), the program loops back to the chipset and memory initialization (block 204).

If it is determined that a manual modification of the set-up data is not required (block 210), then the interface 10, such as EFI for example, is launched (block 216). The interface 10 then reads the BIOS set-up data (block 220) to acquire the initial console configuration. As an example, if the computer 18 is a commercial desktop, the initial console configuration could indicate that a specific keyboard, a specific mouse, a specific printer, and a specific color monitor are attached to the computer 18. The BIOS set-up data is typically compressed and stored in nonvolatile memory 44 until it is extracted and decompressed for the purpose of reading the data.

Reading the BIOS set-up data includes reading a plurality of console variables. This may be done by using a call connect service to populate a plurality of variables that are stored in RAM 42 and denote all possible consoles. Examples of naming schemes for these variables include ConInDev, ConOutDev, and StdErrDev. As previously mentioned, these variables represent the device paths of all possible console input, console output, and console error output devices.

After reading the BIOS set-up data (block 220), the interface 10 determines if one or more console variables need to be updated (block 222). If required, the console variables are then updated (block 224) to reflect the current console configuration. The interface 10 then begins the process of loading one or more interface drivers (block 226) so that they can manage a corresponding hardware component. As known to persons of ordinary skill in the art, loading a driver includes retrieving the driver from a non-volatile storage and relocating the retrieved driver to available memory.

The interface 10 then reads the global console variables (block 228) to obtain the active input, output, and standard error consoles (e.g., ConIn, ConOut, and StdErr) as well as the current device paths for all possible input, output, and error output devices (e.g., ConInDev, ConOutDev, and StdErrDev). The interface 10 then navigates through the list of ConIn/ConOut devices and examines each device for validity (block 230). The interface 10 keeps track of these devices as Device Path Instances, wherein each Instance may contain one or more device path nodes that describe the device. If the device paths are valid, copies are made of the Device Path Instances (block 231). The interface 10 then examines the copies to check that they are valid consoles.

It should be noted that if a node type is a Universal Asynchronous Receiver/Transmitter (UART) and it is found to be a valid console, then the device may have to be configured further to match a corresponding COM port setting. This further includes reviewing a plurality of console redirection parameters obtained using the associated driver, wherein each entry describes a COM port setting, such as, for example, a baud rate, a parity bit (if used), and a stop bit.

After the interface 10 reads the global variables (block 230) and determines that the consoles are valid, the interface 10 invokes the drivers' entry points that correspond to the appropriate console variables (block 232). In other words, for each console the interface 10 determines if an interface driver exists that can manage a particular device path, and then activates the interface driver by invoking a start routine for the device. It should be noted that the interface 10 invokes the start routines for the drivers in an order defined by the console variables. As discussed above, the interface 10 is extracting the interface drivers from the nonvolatile memory 44 to the volatile memory, such as RAM 42.

After preparing the initial consoles and programming the global variables in accordance with the initial snap shot of the console configuration stored in BIOS, the interface 10 starts an event handler, such as the event handler 100 from FIG. 3, to dynamically manage the console variables throughout the remainder of the pre-boot process (234). Once activated, the event handler 100 is capable of managing the consoles based on need, as events occur that affect the console configuration. This dynamic management of the consoles is described in more detail with reference to FIG. 5.

Referring to FIG. 5, the event handler 100 from FIG. 3, monitors the computer in the pre-boot environment for an event of interest (block 302), wherein an event of interest is any event affecting the console configuration that arises before an operating system is loaded. The event handler 100, using its controller 102 and the console maintenance agent 104, monitors the computer to determine if a new console is attached to the computer, in the pre-boot environment (block 304). This event is often referred to by persons of ordinary skill in the art as "hot swapping," as the device is attached to the computer after the computer has already begun the boot process. If the console maintenance agent 104 detects a newly added console (block 304), the new console is identified (block 306) and the event is registered with the controller 102. Thereafter, the controller 102 invokes a console filtering algorithm to update the appropriate console variables (block 310), adding the new console to a global variable, so that the updated console variables reflect the most recent console configuration.

After updating the console variables (block 310), the controller 102 disconnects (i.e., stops) all of the current interface drivers (block 312), reads the updated console variables (block 314) and commands the driver loader 112 to connect (i.e., start) all of the interface drivers again (block 316). Thereafter, the event handler 100 continues to monitor the computer 18 for another event of interest (block 302) until the operating system 30 is loaded. In the foregoing example, all of the consoles were stopped and then started again by the event handler 100. However, persons of ordinary skill in the art will appreciate that, several different techniques are possible. For example, it is also possible for the controller 102 to keep the existing drivers attached while the driver loader 112 starts only the driver for the newly added console. The ability to start and stop individual drivers is achieved using the unique load, start, and stop services of the interface driver model, which is extremely useful for validating new drivers and hardware.

In addition to monitoring the computer 18 for the attachment of a new console (block 304), the console maintenance agent 104 also monitors the computer 18 in the pre-boot environment for the detachment of an existing console (block 320). When the console maintenance agent 104 detects the detachment of an existing console, the console maintenance agent 104 identifies the detached console (block 322) and passes the information to the controller 102. The controller 102 then invokes the console filtering algorithm to update the appropriate console variables (block 310), deleting the particular console, so that the updated console variables reflect the most recent console configuration.

After updating the console variables (block 310), the controller 102 disconnects all of the current interface drivers (block 312), reads the updated console variables (block 314) and commands the driver loader 112 to connect all of the interface drivers again (block 316). Alternatively, the controller 102 may stop only the driver for the detached console. The event handler 100 then continues to monitor the computer 18 for another event of interest (block 302).

Still referring to the event handler 100 of FIG. 5, the driver monitor 106 (shown in FIG. 3) monitors the computer 18 in the pre-boot environment for a new driver that is loaded that is a better match (i.e., enhanced functionality) for an existing console (block 324). When the driver monitor 106 locates the better driver for the existing console, the driver monitor 106 identifies the better driver (block 326) and passes the information to the controller 102. The controller 102 then invokes the console filtering algorithm to update the appropriate console variables (block 310), mapping the better driver to the existing console, so that the updated console variables reflect the most recent and optimal console configuration.

After updating the console variables (block 310), the controller 102 disconnects all of the current interface drivers (block 312), reads the updated console variables (block 314) and commands the driver loader 112 to connect all of the interface drivers again (block 316). The event handler 100 is thus capable of detaching an existing driver that was managing a particular device and instead attaching and using another driver to manage that device. It should be noted that the controller 102 may alternatively stop only the driver for the particular device and command the driver loader to start the better driver for that device. Regardless of the technique used to start and stop the drivers, the event handler 100 then continues to monitor the computer for another event of interest (block 302), until the operating system is loaded.

The event handler's error monitor 110 (shown in FIG. 3) monitors the computer 18 in the pre-boot environment for an error, such as, for example, a catastrophic event (block 330), before activation of the operating system 30. When the error monitor 110 detects such an error, the error monitor 110 communicates the event to the controller 102, which, in turn, records the error in an operatively connected memory for diagnostic purposes (block 332). After the error is detected, the controller 102 may alternatively route a set of data associated with the error, through a serial port connected to the computer 18, to a diagnostic processor. If the error detected by the error monitor 110 is catastrophic in nature, the computer 18 will require rebooting. Otherwise, the event handler 100 continues to monitor the computer 18 for an event of interest (block 302) until the operating system 30 is loaded.

Contention for a console in a pre-boot environment is another type of event that may be managed by the event handler 100. If the console maintenance agent 104 detects that ownership of a shared console has been relinquished (block 334), the console maintenance agent 104 communicates the event to the controller 102 which passes control to the next requester in priority, if any (block 336). For example, at a given instance, three customers could be vying for a particular COM port. The customers could be a baseboard management controller, an interface console output, or a remote debugger. If one of them relinquishes ownership of the COM port, then control can be passed on to the next requester in priority by the controller 102.

After passing control to the next requester in priority (block 336), the controller 102 then invokes the console filtering algorithm to update the appropriate console variables (block 310), so that the updated console variables reflect the most recent and optimal console configuration. Thereafter, the controller 102 disconnects all of the current interface drivers (block 312), reads the updated console variables (block 314) and commands the driver loader 112 to connect all of the interface drivers again (block 316). The event handler 100 then continues to monitor the computer for another event of interest (block 302) until the operating system is loaded.

Persons of ordinary skill in the art will appreciate that the disclosed teachings can alternatively be applied to dynamically manage other events of interest in the pre-boot environment. The event handler 100 continues to monitor the computer for events of interest as long as an operating system has not yet launched (block 340). Once an operating system is launched, the interface 10, including the event handler 100, may be terminated (block 342). If a developer chooses not to launch an operating system, for any of a variety of reasons, the interface 10 may continue to function to provide a unique operational environment that offers a command line interface (similar to DOS) that allows, for example, a number of diagnostic tools to be performed. Yet another alternative example could include launching an operating system and terminating the majority of the interface functions, but keeping one or more functions active. As an example, the interface's runtime services could remain active, so that the platform firmware sets and maintains the time for the computer.

As described with relation to the foregoing example, the event handler 100 allows an OS and platform firmware (any software that is included in ROM) to communicate information necessary to support the OS boot process, thereby minimizing the investment of resources. The event handler 100 permits a standard shrink-wrap OS intended to run on a hardware platform to boot on a variety of system designs without additional platform or OS customization. This allows for platform innovation to introduce new features and functionality that enhance platform capability without requiring new code to be written in the OS boot sequence. In other words, the platform and OS are able to evolve and innovate independently of one another. Furthermore, the examples discussed above permit developers to design the interface so that it is compatible with a range of underlying hardware devices functions without having explicit knowledge of the specifics for each device in the range.

Although certain apparatus and methods implemented in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of performing event based console management in a pre-boot environment comprising:
    reading a plurality of console variables from a nonvolatile storage medium;
    loading a driver from the nonvolatile storage medium;
    activating the driver by invoking a start routine for the console;
    monitoring for an event of interest prior to loading an operating system;
    updating the console variables to reflect and preserve an updated console configuration if an event of interest has occurred; and
    disconnecting at least one of the plurality of consoles and reconnecting at least one other console in accordance with the updated console configuration.

2. A method as defined in claim 1 wherein monitoring for an event of interest comprises at least one of: monitoring for attachment of a new console, monitoring for detachment of an existing console, monitoring for a resource contention, monitoring for a console relinquished by one of its owners, monitoring for a new driver to replace the driver, and monitoring the computer for a system error.

3. A method as defined in claim 1, further comprising determining if the driver can manage the console.

4. A method as defined in claim 1 wherein reading a plurality of console variables comprises reading at least of an input console variable, an output console variable, or a standard error console variable.

5. A method as defined in claim 1 wherein loading the driver comprises retrieving the driver from a nonvolatile storage medium and relocating the driver to a RAM.

6. A method as defined in claim 1 wherein invoking the start routine is performed in an order defined by the console variables.

7. A method as defined in claim 1, further comprising providing an early update of the console variables to account for changes associated with the console that are made by an underlying firmware.

8. A method as defined in claim 1, further comprising identifying a set of valid consoles to construct one or more global variables.

* * * * *